United States Patent
Nakagawa

(10) Patent No.: US 8,135,118 B2
(45) Date of Patent: Mar. 13, 2012

(54) COMMUNICATION APPARATUS AND METHOD OF CONTROLLING SAME

(75) Inventor: Kaori Nakagawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 1126 days.

(21) Appl. No.: 11/950,516

(22) Filed: Dec. 5, 2007

(65) Prior Publication Data

US 2008/0130858 A1 Jun. 5, 2008

(30) Foreign Application Priority Data

Dec. 5, 2006 (JP) ................. 2006-328844

(51) Int. Cl.
*H04M 1/56* (2006.01)
*H04M 15/06* (2006.01)
(52) U.S. Cl. ......... 379/142.04; 379/207.03; 379/207.13; 379/304
(58) Field of Classification Search ............. 379/142.04, 379/207.03, 207.13, 304
See application file for complete search history.

(56) References Cited

U.S. PATENT DOCUMENTS
5,471,317 A * 11/1995 Charbonnier ................. 358/400

FOREIGN PATENT DOCUMENTS
| JP | 02209039 | * | 8/1990 |
| JP | 3-249849 A | | 11/1991 |
| JP | 2002095048 A | | 3/2002 |

OTHER PUBLICATIONS

Office Action issued in corresponding Japanese Patent Application No. 2006-328844 dated Feb. 25, 2011.
Office Action issued in corresponding Japanese patent application No. JP2006-328844, dated Nov. 11, 2011.

* cited by examiner

*Primary Examiner* — Quynh Nguyen
(74) *Attorney, Agent, or Firm* — Rossi, Kimms & McDowell LLP

(57) ABSTRACT

An incoming call from a public communication network is sensed in a communication apparatus that is capable of switching between an automatic response mode and a manual response mode as a response to an incoming call. If incoming of a specific call signal has been sensed, the response to this incoming call is switched from the automatic response mode to the manual response mode.

4 Claims, 4 Drawing Sheets

COMMUNICATION APPARATUS AND METHOD OF CONTROLLING SAME

BACKGROUND OF THE INVENTION

1. Field of the Invention

The present invention relates to a response operation following the placement of a call to an emergency facility (Telephone No. 119, etc., in Japan) in a communication apparatus.

2. Description of the Related Art

In processing executed at the time of an incoming call in a communication apparatus, the general practice in the prior art is to start communication upon automatically responding to a predetermined call signal.

Further, processing following the placement of a call to an emergency facility in a communication apparatus involves processing that changes a receive mode in the standby state or processing that takes into account "callback" from the emergency facility, such as no automatic response to a specific call signal.

With the prior art described above, however, the following problems arise in a case where "callback" is received when an automatic response mode is set:

(1) the communication terminal recognizes an ordinary call signal and performs a receiving operation upon responding automatically; and (2) in case of a communication terminal that cannot sense a "callback" signal per se, a connected telephone will not respond automatically and will not ring.

SUMMARY OF THE INVENTION

The present invention realizes to make telephone conversation possible in response to "callback" from an emergency facility regardless of the setting of a receive mode.

Furthermore, the present invention realizes to make it possible to notify a user of "callback" from an emergency facility in the case of a communication apparatus that does not possess a telephone-conversation function.

According to one aspect of the present invention, there is provided a communication apparatus capable of switching between an automatic response mode and a manual response mode as a response to an incoming call, comprising: a sensing unit adapted to sense an incoming call from a public communication network; and a switching unit adapted to switch the response to the incoming call from the automatic response mode to the manual response mode in a case where incoming of a specific call signal has been sensed by the sensing unit.

According to another aspect of the present invention, there is provided a communication apparatus capable of switching between an automatic response mode and a manual response mode as a response to an incoming call, comprising: a timekeeping unit adapted to measure elapse of a fixed period of time following placement of an outgoing call to a specific telephone number or from end of a telephone conversation with a specific telephone number; and a switching unit adapted to switch from the automatic response mode to the manual response mode when the fixed period of time is measured by the timekeeping unit, and to switch from the manual response mode to the automatic response mode after the fixed period of time has elapsed.

According to still another aspect of the present invention, there is provided a response method of a communication apparatus capable of switching between an automatic response mode and a manual response mode as a response to an incoming call, comprising: sensing an incoming call from a public communication network; and switching the response to the incoming call from the automatic response mode to the manual response mode in a case where incoming of a specific call signal has been sensed in the sensing step.

According to yet another aspect of the present invention, there is provided a response method of a communication apparatus capable of switching between an automatic response mode and a manual response mode as a response to an incoming call, comprising: measuring elapse of a fixed period of time following placement of an outgoing call to a specific telephone number or from end of a telephone conversation with a specific telephone number; and switching from the automatic response mode to the manual response mode when the fixed period of time is measured in the timekeeping step, and switching from the manual response mode to the automatic response mode after the fixed period of time has elapsed.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings.

First Embodiment

Figure 1:
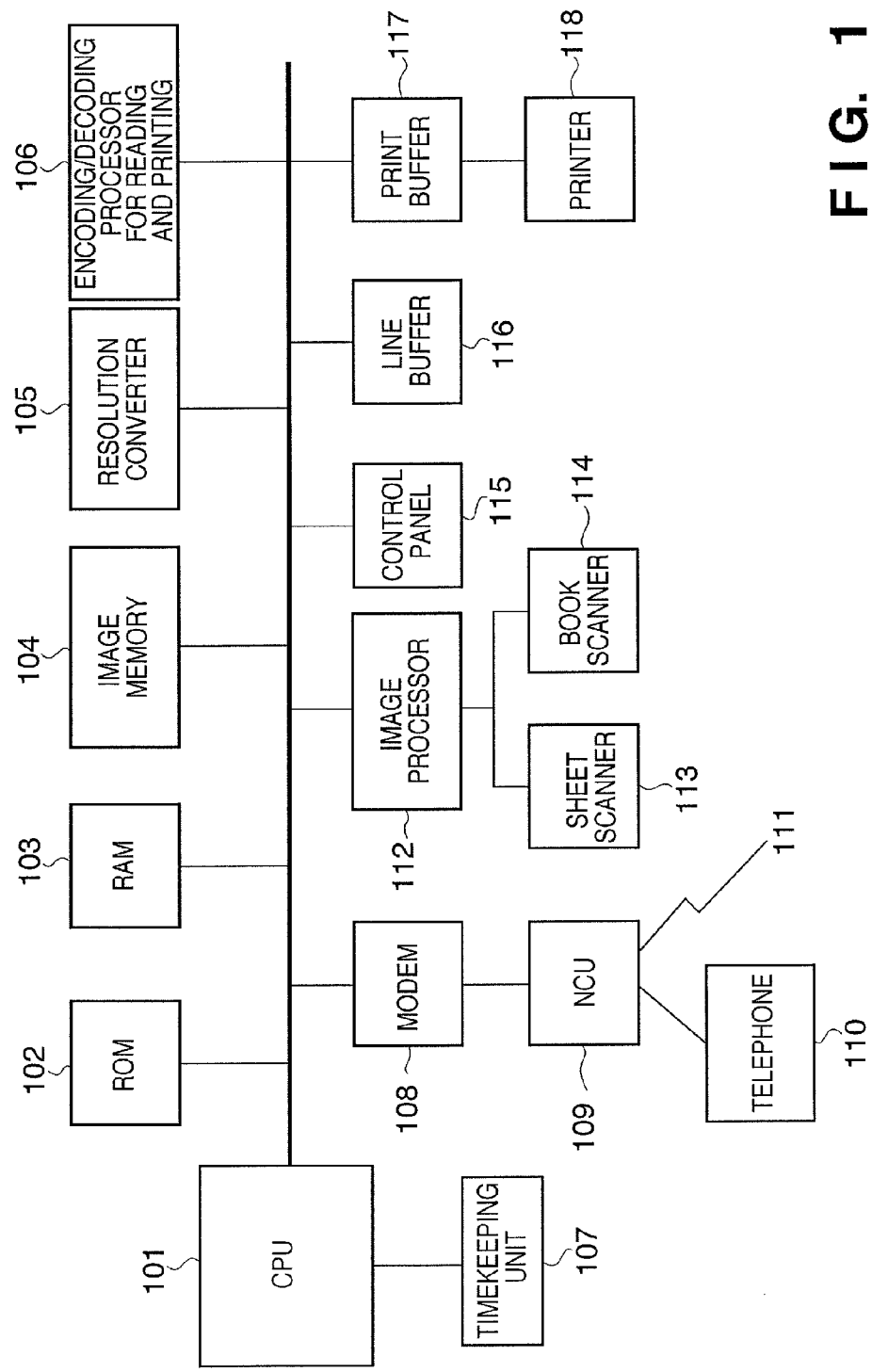
FIG. 1 is a block diagram illustrating an example of the structure of a communication apparatus according to a first embodiment of the present invention.

FIG. 1 is a block diagram illustrating an example of the structure of a communication apparatus according to a first embodiment of the present invention. As shown in FIG. 1, the apparatus includes a CPU (system controller) 101 that controls the overall apparatus; a ROM 102 for storing the control program of the CPU 101 and control data; and a RAM 103 comprising, for example, a SRAM, in which are defined a work area, which is used when the CPU 101 executes processing, and various tables.

The apparatus further includes an image memory 104 comprising, for example, a DRAM, for storing image data; a resolution converter 105 for executing resolution conversion processing such as a millimeter-to-inch resolution conversion of raster data; an encoding/decoding processor (codec) 106 reading and printing, that is, for executing encoding/decoding processing of image data handled by the communication apparatus; and a timekeeping unit 107 comprising an IC or the like, namely a programmable timer for measuring elapse of fixed period of time or operating time interval.

The apparatus further includes a modem 108 for demodulating a modulated signal received from a line and modulating a signal transmitted from the apparatus; and a line i/f unit 109, which comprises an NCU (Network Control Unit) or the like, for controlling connection to a public communication network. In a case where there are two telephone connection terminals, the line i/f unit 109 has a hook sensing circuit for every connection terminal in order to sense off-hook/on-hook at each terminal.

A telephone 110 is a handset (a telephone not having a dialer) or an externally provided telephone (a phone-answering machine), etc., connected to a telephone line through the line i/f unit (NCU) 109. A public communication network 111 is a telephone circuit, etc. Further, the telephone 110 and the public communication network 111 are connected by a relay (not shown). Connection of the relay is controlled in accordance with a changeover signal from the CPU 101.

The apparatus further includes an image processor 112 for applying correction processing to image data read in by a scanner (described later) and outputting high-definition image data; and a sheet scanner 113 and book scanner 114. Each of these comprises a contact-type image sensor (CS image sensor) and a document feeding mechanism, reads a document optically and converts the read document to electrical image data.

The apparatus further includes a control panel 115 comprising a keyboard whereby the operator performs various input operations and a display unit for displaying the status of the apparatus, etc. The control panel 115 displays that instant dialing is possible when the handset is off-hook. When an externally provided telephone is off-hook, the control panel 115 displays that a call is in progress and displays that acceptance of communication reservation is possible.

The apparatus further includes a line buffer 116 used when image-data transfer control is carried out; a print buffer 117, which is a one-page buffer memory that stores character codes for printing; and a printer 118 such as a laser printer or ink-jet printer for printing received images and file data on plain paper, etc. The printer 118 is capable of double-sided printing as well.

Response processing for responding to a callback signal will be described for a case where the communication apparatus having the above-described structure has received the callback signal from an emergency facility during standby. This processing is executed by the CPU 101 of the communication apparatus in accordance with a program that has been stored in the ROM 102.

Figure 2:
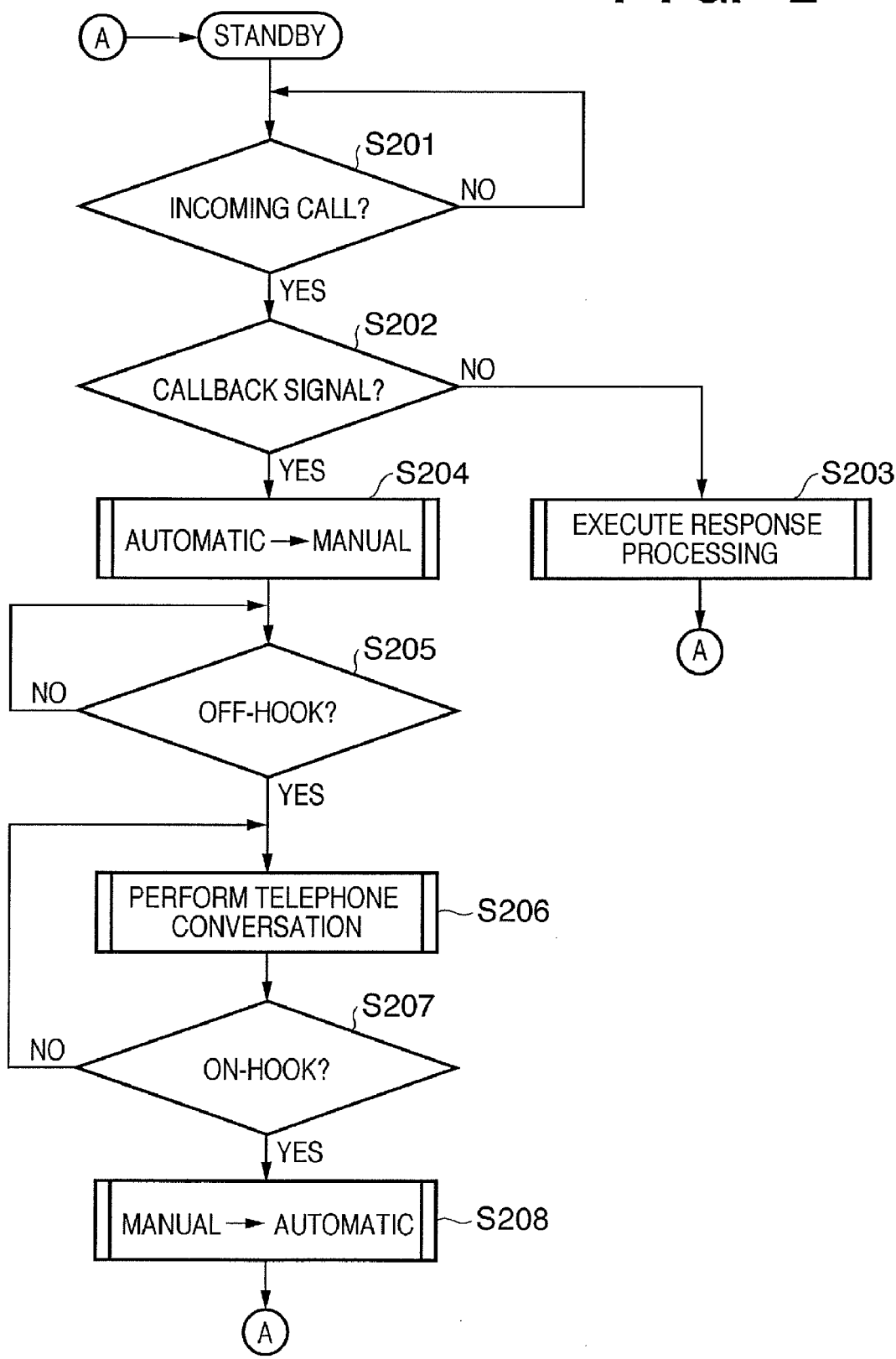
FIG. 2 is a flowchart illustrating processing for responding to a callback signal from an emergency facility in the first embodiment.

FIG. 2 is a flowchart illustrating response processing for responding to a callback signal from an emergency facility in the first embodiment. First, in step S201, if the CPU 101 senses an incoming call from the public communication network 111 while the communication apparatus is standing by, control proceeds to step S202. In step S202, the CPU 101 determines whether the sensed incoming call is an incoming call from an emergency facility corresponding to a callback signal from the emergency facility after the emergency facility is notified. If the incoming call is an ordinary call signal and not a callback signal, control proceeds to step S203 and the CPU 101 executes ordinary response processing.

On the other hand, if it is determined in step S202 that the sensed incoming call is an incoming call corresponding to a callback signal from an emergency facility, control proceeds to step S204. Here the CPU 101 changes over the standby (receive) mode of the communication apparatus from an automatic response mode to a manual response mode. The manual response mode is a standby (receive) mode in which an automatic shift to receive processing is not made even if an incoming call to the communication apparatus is sensed. A shift to the receive mode, therefore, is not made until the operator performs a receive operation. Further, in the manual receive mode, the telephone 110 connected to the communication apparatus is caused to ring by a call signal. As a result, the operator can be notified of the fact that a call is currently incoming.

Next, in step S205, during ringing of the telephone 110 by this callback signal, the operator takes the handset off the hook and responds to this callback signal. If an off-hook signal is sent to the CPU 101 by this response, the CPU 101 advances processing to step S206 and shifts to the telephone-conversation state. Next, in step S207, the CPU 101 determines whether the handset is on-hook and the telephone conversation has ended. If on-hook is sensed and the CPU 101 determines that the call has ended, then control proceeds to step S208. Here the CPU 101 switches the standby (receive) mode from the manual response mode to the automatic response mode. The transition is again made to the ordinary standby state.

In accordance with the first embodiment, a response can be made to a callback signal from an emergency facility, regardless of the setting of the standby (receive) mode, and a telephone conversion can be carried out.

Second Embodiment

Next, a second embodiment of the present invention will be described in detail with reference to the drawings.

The structure of the communication apparatus in the second embodiment is similar to that shown in FIG. 1 of the first embodiment and need not be described again.

Described in the second embodiment is processing for carrying out a telephone conversion upon responding to an incoming callback signal from an emergency facility after a call to a specific telephone number that has been set beforehand as that of the emergency facility or at the end of a telephone-conversation state. It should be noted that it is possible to set a plurality of specific telephone numbers.

Figure 3:
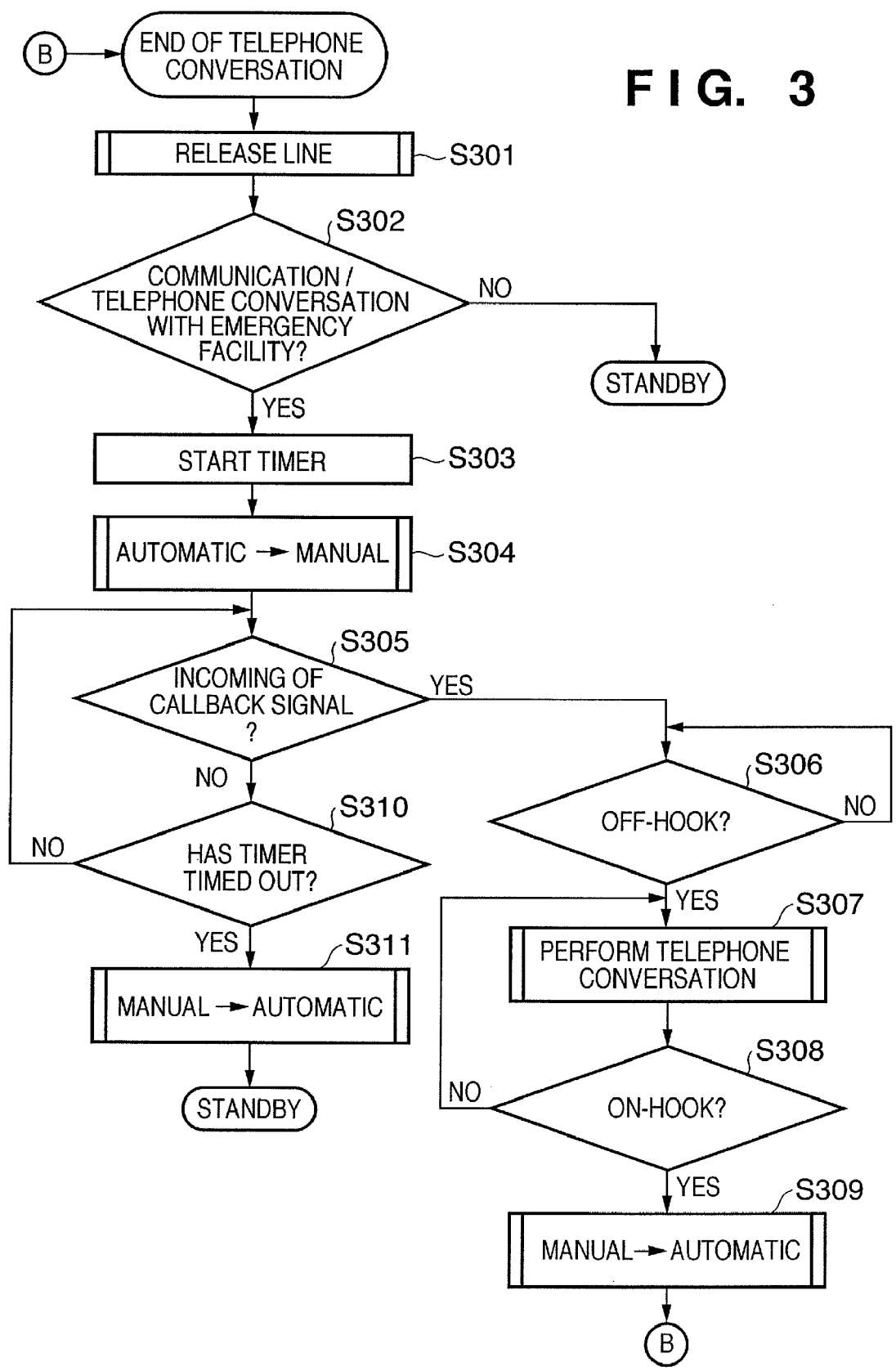
FIG. 3 is a flowchart illustrating processing for responding to a callback signal from an emergency facility in a second embodiment of the present invention.

FIG. 3 is a flowchart illustrating processing for responding to a callback signal from the emergency facility according to the second embodiment. If a telephone conversation or communication has ended, then the CPU 101 advances processing to step S301, releases the line to the public communication network 111 and returns to the standby state. At step S302, based upon the specific telephone set in advance, the CPU 101 determines whether this conversation/communication is directed to an emergency facility. If the result of the determination is communication with an ordinary party, control returns to the ordinary standby state. On the other hand, if this conversation/communication is directed to an emergency facility, the CPU 101 advances processing to step S303 and instructs the timekeeping unit 107 to start a timer for measuring a preset time. At step S304, the CPU 101 changes over the standby (receive) mode of the communication apparatus from the automatic response mode to the manual response mode. Next, at step S305, the CPU 101 determines whether this is an incoming call from an emergency facility corresponding to a callback signal from the emergency facility during standby in the manual response mode. If the call is an incoming call from the emergency facility, the CPU 101 stops the timer and advances processing to step S306. If the call is not an incoming call from the emergency facility, then control proceeds to step S310.

The processing of steps S306 to S309 is the same as the processing of steps S205 to S208 shown in FIG. 2 described in the first embodiment. If the operator responds using the telephone 110 and off-hook is sensed ("YES" at step S306), a telephone-conversation state is established (S307). If on-hook is sensed during the telephone-conversation state ("YES" at step S408), the CPU 101 determines that the conversation has ended, switches the standby (receive) mode from the manual response mode to the automatic response mode (S309) and returns to processing after the end of callback.

At step S310, the CPU 101 checks to determine whether the timer started at step S303 has timed out. If the timer has timed out, the CPU 101 determines that there is no incoming callback signal during the manual response mode and advances processing to step S311. At step S311, the CPU 101 changes over the standby (receive) mode from the present manual response mode to the automatic response mode and again effects a transition to the ordinary standby state.

In accordance with the second embodiment, a response can be made to an incoming callback signal from an emergency facility, and conversation becomes possible, following the end of a telephone conversation with the emergency facility. This effect is realized in addition to the effects of the first embodiment.

Third Embodiment

A third embodiment of the present invention will now be described in detail with reference to the drawings.

The structure of the communication apparatus in the third embodiment is similar to that shown in FIG. 1 of the first embodiment and need not be described again.

Described in the third embodiment is processing in which notification of callback is given by display on the control panel and output of a report in case of callback from an emergency facility while the communication apparatus is standing by.

Figure 4:
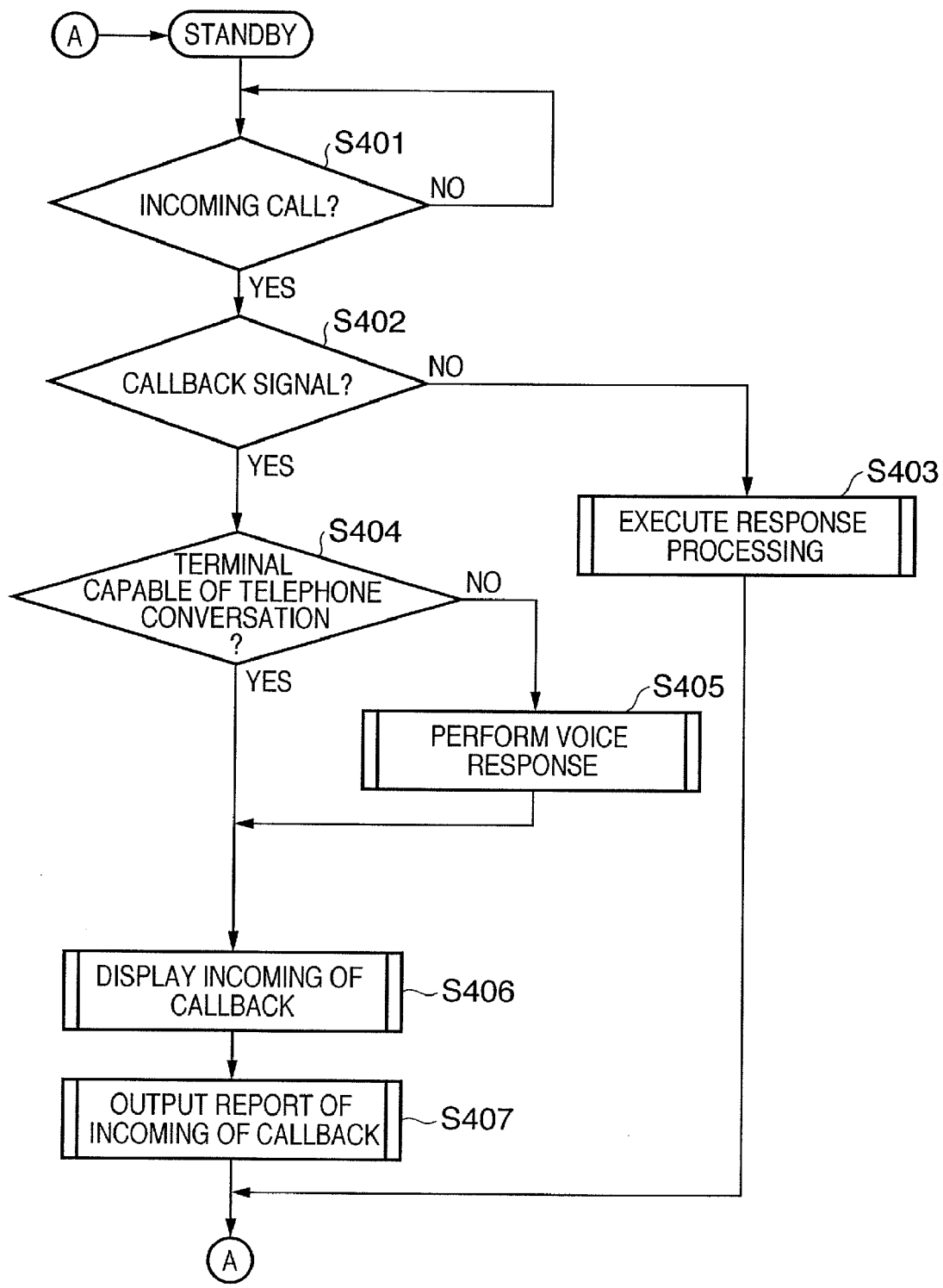
FIG. 4 is a flowchart illustrating processing for responding to a callback signal from an emergency facility in a third embodiment of the present invention.

FIG. 4 is a flowchart illustrating processing for responding to a callback signal from the emergency facility according to the third embodiment. First, at step S401, if the CPU 101 senses an incoming call from the public communication network 111 while the communication apparatus is standing by, control proceeds to step S402. Here the CPU 101 determines whether the sensed incoming call is an incoming call corresponding to a callback signal from the emergency facility after notification of the emergency facility. In a case where the incoming call is an incoming call of an ordinary call signal and not an incoming call corresponding to a callback signal, the CPU 101 advances processing to step S403 and executes ordinary response processing.

On the other hand, if it is found at step S402 that the incoming call corresponds to a callback signal from the emergency facility, the CPU 101 advances processing to step S404 and determines whether the communication apparatus has an optional function for a telephone conversion, namely whether a telephone conversation is possible. In case of a communication apparatus for which a telephone conversation is not possible, the CPU 101 advances processing to step S405, makes an automatic response and gives notification that the communication apparatus is a "COMMUNICATION APPARATUS INCAPABLE OF TELEPHONE CONVERSATION" (e.g., a dedicated FAX machine) by a voice response using speech synthesis. The CPU 101 then notifies the communicating party of a "CONTACTABLE ADMINISTRATOR NUMBER" set in advance. Control then proceeds to step S406.

In a case where it is determined at step S404 that the communication apparatus is a communication apparatus that is capable of telephone conversation, control proceeds to step S406. Here the fact that the incoming call is an incoming call of a callback signal from the emergency facility is displayed on an LCD, etc., of the control panel 115. Then, at step S407, the attention of the user is acquired by outputting a report from the printer 118 as incoming-call history or communication history, and a transition is again made to the ordinary standby state.

In accordance with the third embodiment, it is possible to notify the user of callback from an emergency facility even with a communication apparatus that does not possess a telephone-conversation function (e.g., a dedicated FAX communication terminal not having a telephone).

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire actual process based upon the designation of program codes and implements the functions according to the embodiments.

It goes without saying that the present invention further covers a case where, after the program codes read from the recording medium are written to a memory provided on a function expansion board inserted into the computer or to a memory provided in a function expansion unit connected to the computer, a CPU or the like provided on the function expansion board or function expansion unit performs a part of or the entire process based upon the designation of program codes and implements the functions of the above embodiments.

In accordance with the present invention, it is possible to carry out a telephone conversation with respect to "callback" from an emergency facility regardless of setting of a receive mode.

Further, it is possible to notify a user of "callback" from an emergency facility even with a communication apparatus that does not possess a telephone-conversation function (e.g., a dedicated FAX communication terminal not having a telephone).

Accordingly, communication (telephone conversation) with an emergency facility can be improved following the end of a report to the emergency facility.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328844, filed Dec. 5, 2006, which is hereby incorporated by reference herein in its entirety.

What is claimed is:

1. A communication apparatus capable of switching between an automatic response mode and a manual response mode, the automatic response mode and the manual response mode being for responding to an incoming call, comprising:
 a timekeeping unit adapted to measure a fixed period of time from the beginning of an outgoing call to a specific telephone number or from an end of a communication with a specific telephone number; and
 a switching unit adapted to switch from the automatic response mode to the manual response mode when the timekeeping unit starts to measure the fixed period of time, and to switch from the manual response mode to the automatic response mode after the fixed period of time has been measured by the timekeeping unit;
 wherein the manual response mode is configured to respond to an incoming call during the fixed period of time, and the automatic response mode is configured to respond to an incoming call after the fixed period of time has been measured.

2. The apparatus according to claim 1, further comprising a setting unit adapted to be capable of setting a plurality of the specific telephone numbers.

3. The apparatus according to claim 1, wherein said timekeeping unit is capable of freely setting the fixed time period.

4. A response method of a communication apparatus capable of switching between an automatic response mode and a manual response mode, the automatic response mode and the manual response mode being for responding to an incoming call, the response method comprising:
 measuring of a fixed period of time from the beginning of an outgoing call to a specific telephone number or from an end of a communication with a specific telephone number; and
 switching from the automatic response mode to the manual response mode when the fixed period of time is started to be measured, and switching from the manual response mode to the automatic response mode after the fixed period of time has been measured;
 wherein the manual response mode is configured to respond to an incoming call during the fixed period of time, and the automatic response mode is configured to respond to an incoming call after the fixed period of time has been measured.

* * * * *